April 27, 1965 W. E. MILROY 3,181,139
RADAR INFORMATION RECORDING SYSTEM
Filed July 26, 1962 3 Sheets-Sheet 1

INVENTOR.
WARREN E. MILROY
BY
ATTORNEYS

April 27, 1965 W. E. MILROY 3,181,139
RADAR INFORMATION RECORDING SYSTEM
Filed July 26, 1962 3 Sheets-Sheet 2

INVENTOR.
WARREN E. MILROY
BY
ATTORNEYS

April 27, 1965 W. E. MILROY 3,181,139
RADAR INFORMATION RECORDING SYSTEM
Filed July 26, 1962 3 Sheets-Sheet 3

INVENTOR.
WARREN E. MILROY
BY
ATTORNEYS 3,181,139
RADAR INFORMATION RECORDING SYSTEM
Warren E. Milroy, San Diego, Calif., assignor to the United States of America as represented by the Secretary of the Navy
Filed July 26, 1962, Ser. No. 212,752
8 Claims. (Cl. 343—5)
(Granted under Title 35, U.S. Code (1952), sec. 266)

The invention described herein may be manufactured and used by or for the Government of the United States of America for governmental purposes without the payment of any royalties thereon or therefor.

The present invention relates to a system for recording radar information and more particularly a system for recording wide band radar video, trigger and antenna azimuth and specifically a system for recording wide band radar video, trigger, and antenna azimuth on magnetic tape.

At the present time there exists a need for a radar recorder that is capable of recording the wide band radar video and trigger information and at the same time recording the antenna azimuth information. Such a recorder could be used to optimize automatic tracking equations wherein it is desired to put the radar information obtained over a period of time on tape and then analyze the same. This system may also be used in conjunction with reconnaisance and for training detection and tracking operators. In addition the present system lends itself to the post-collision or crash fact finding situation wherein the radar systems at an air terminal would be constantly monitored and resulting information recorded permanently on magnetic tape which may be played back at a later date to ascertain possible causes of collisions or crashes in the area surrounding the air terminal.

In utilizing the present technique the greatest problems are involved in converting a tape recorder into a system capable of recording radar information. Since both the radar video and radar trigger signals contain wide band frequency components and since there is only one wide band channel available on the tape recorder the two signals must be combined and some way found for feeding them into the recorder. It also follows that provision must be made for separating these two signals again in the reproduce mode of operation.

The tape recorder utilizes a spinning head recording technique which by its very nature poses a problem which can be quite serious in radar recording. Since there are four heads on the tape wheel and only one head is in contact with the tape at any given time it is necessary to switch the heads in and out of the circuit at the appropriae time while reproducing. A redundant period of about 120 micro-seconds is utilized for head switching so as to minimize loss of data. During this period one head is just about to leave the tape and the following head has just contacted the tape. Since the signal is put on the tape in FM form, when the heads are switched an instantaneous phase shift is fed into the demodulator and shows up at the output of the demodulator as a very larrge transient. It is necessary in radar recording to process the signal in such a way that this transient will not be present in the output signal.

Another factor to be considered when utilizing the recording technique is to ensure that timing and accuracy will be present in the reproduced data. In radar work this is quite important since the user is interested in using the data in conjunction with a very accurate time base to give range information. Therefore, timing inaccuracies must be kept to a minimum and the inaccuracies must be measured so that they can be taken into account when using the reproduced data.

The antenna position data entering the system is in the form of three phase synchro information and can be considered as four separate signals, a rotor voltage and three stator voltages. Since there is only one unused channel left on the tape, a 10 kc. audio channel, it then appears that the four antenna signals must be mixed in some way and placed on this channel. It follows then that means must be provided for separating the antenna signals in the reproduce mode so that they may emerge from the system output in the same form in which they entered the system.

An object of the present invention is to provide a system for recording wide band radar video and trigger information and azimuth information on magnetic tape.

A further object of the present invention is to provide a system for recording radar information for use at a later time.

An additional object of the present invention is to provide a synchro to digital conversion system for use with a system for recording wide band video information.

An additional object of the present invention is to provide a digital to synchro conversion unit for use with a system for recording radar information.

An additional object of the present invention is to provide a system for recording radar information which may be used in training detection and tracking operators.

A further object of the present invention is to provide a system for recording radar information which may be used for post collision and crash fact finding work.

Another object of the present invention is to provide a system for recording radar information which may be used in conjunction with computer equipment and for optimizing tracking equations.

Various objects and advantages will appear from the following description of an embodiment of the invention, and the novel features will be particularly pointed out hereinafter in connection with the appended claims.

The invention will be more fully understood and explained in conjunction with the following detailed description of the illustrative embodiment thereof taken in connection with the appended drawings wherein.

Figure 1:
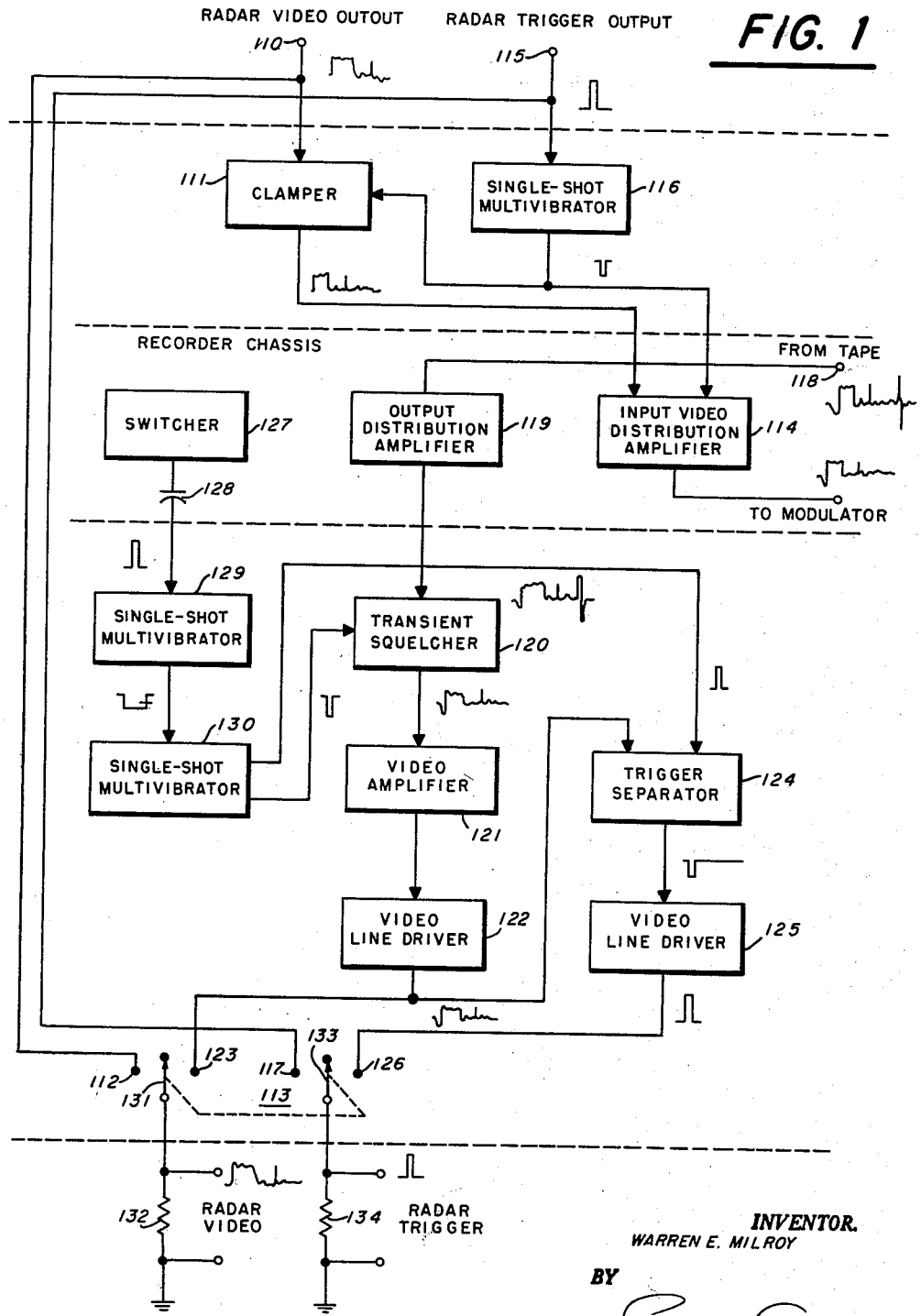
FIG. 1 is a block diagram of the system for recording and reproducing radar video and radar trigger from magnetic tape.

In FIG. 1 radar video is brought into terminal 110 and coupled to a clamping circuit 111. The radar video from terminal 110 is also coupled to a terminal 112 on a live-tape output select switch 113. From the clamping circuit 111 the video is coupled to an input video distribution amplifier 114 contained within the recorder chassis. From the distribution amplifier 114 the video is coupled to a modulator, not shown, for conversion from AM to FM and then is recorded on magnetic tape.

The radar trigger from the radar system is coupled to input terminal 115 and then to a single shot multivibrator 116. The radar trigger from the input terminal 115 is also coupled to a terminal 117 on the live-tape select switch 113.

The output from the trigger single shot multivibrator 116 is coupled to the clamping circuit 111 and also coupled to the distribution amplifier 114 wherein the trigger is amplified and then is coupled to the modulator, not shown, for conversion from AM to FM and subsequently recorded on magnetic tape.

In reproducing, the tape is read by a reproducing head and coupled to a terminal 118 contained within the recorder chassis. From terminal 118 the video and trigger are coupled to an output distribution amplifier 119, also contained within the recorder chassis. The output of the distribution amplifier 119 is coupled to a head switching transient squelch circuit 120 and then to a video amplifier 121. The output of the video amplifier 121 is coupled to the input of the video line driver 122, the output of which goes to a terminal 123 of the output select switch 113. The output of video line driver 122 is also coupled to the input of a trigger separator or AND gate 124. The output of the separator 124 is connected to the input of the trigger line driver 125 the output of which is connected to a terminal 126 of the output select switch 113.

A signal is coupled from a switcher 127 contained within the recorder chassis which is used to initiate the switching of the reproduce head. The signal is coupled through a capacitor 128, also within the recorder chassis, and then to a single shot multivibrator 129 for delay. The output of the single shot 129 is coupled to a single-shot multivibrator 130 the output of which is coupled to another input of the trigger separator 124. Another output from the single shot 130 is coupled to an input on the head switching transient squelch circuit 120.

The radar video is coupled from the output select switch 113 on switch contact 131 to a load resistor 132 for use in the user equipment.

The output radar trigger is coupled to switch contact 133 of the output select switch 113 and then through a load resistor 134 to ground for use in the ultimate user equipment.

Figures 2, 4:
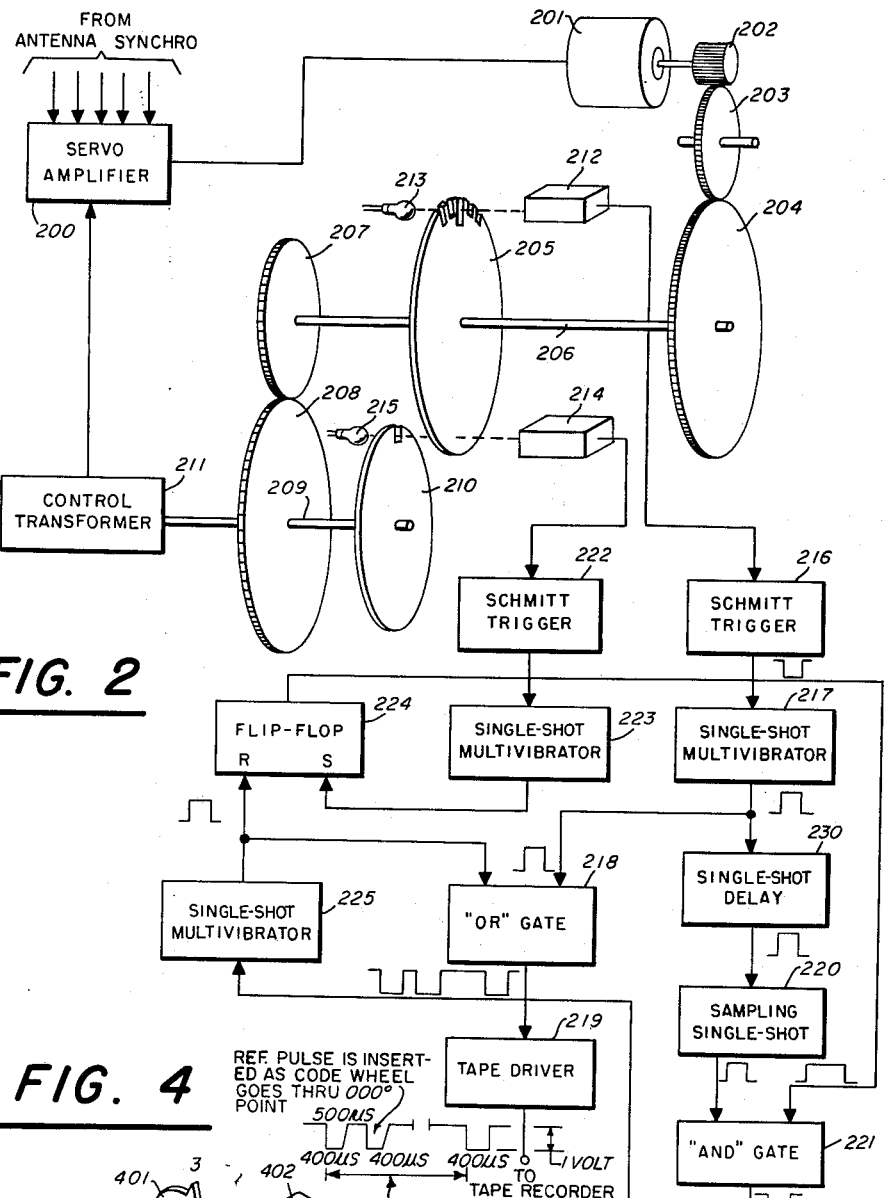
FIG. 2 is a simplified block diagram of the synchro to digital conversion unit used for recording antenna azimuth position on magnetic tape.
FIG. 4 is an illustrative showing of the position of the information recorded on magnetic tape with respect to the spinning head used.

In the block diagram of FIG. 2 which shows the synchro to digital conversion system for recording antenna azimuth position, information from the antenna synchro is coupled to a servo amplifier 200 which develops a drive voltage which is coupled to a servo motor 201 having an output gear 202. In geared relationship with output gear 202 is an intermediate gear 203 having a 3 to 1 ratio with respect to gear 202. Also in contact with gear 203 is a gear 204 having a 9 to 1 ratio which drives a code wheel 205. Code wheel 205 and gear 204 are mounted on a shaft 206 and also positioned on shaft 206 is a gear 207 which engages a gear 208. Gear 207 and 208 have a 4 to 1 ratio. Gear 208 is mounted on a shaft 209 and also mounted on one end of shaft 209 is a code wheel 210. On the other end of shaft 209 is a 1 to 1 control transformer 211 which provides a feedback voltage which is coupled back to the servo amplifier 200.

Positioned adjacent one side of code wheel 205 is a photo-cell 212 and on the other side of code wheel 205 opposite photo cell 212 is a lamp 213.

Code wheels 205 and 210 are positioned such that there is an overlap, i.e., the code wheel 205 passes close to and in over-lapping relationship with code wheel 210. Positioned on one side of code wheel 205 is a photo-cell 214 and directly opposite and on the one side of code wheel 210 is a lamp 215.

The output of photocell 212 is coupled to an input on a Schmitt trigger circuit 216 the output of which is coupled to an input on a single shot multivibrator 217. An output of the single shot multivibrator 217 is coupled to an input of an OR gate 218 and another output from the single shot 217 is coupled to a delay single shot 230. The output of the delay single shot 230 is coupled to a sampling single shot 220 the output of which is coupled as one input to an AND gate 221.

The output of photocell 214 is coupled to a Schmitt trigger circuit 222 the output of which is coupled to a single shot multivibrator 223. The output of the single shot 223 is coupled to the set input on a flip-flop 224. The output of the flip-flop 224 is coupled as one input to AND gate 221. The output of AND gate 221 is connected to a single-shot multivibrator 225 one output of which is coupled back to the reset input on flip-flop 224. Another output from the single shot 225 is coupled as one input to the OR gate 218. The output of OR gate 218 is coupled to a tape driver 219 the output of which goes to an audio input of the tape recorder.

In the block diagram of FIG. 1 which shows the digital to synchro conversion system for reproducing the antenna azimuth position the audio output from the tape recorder is coupled in on terminal 300 to a Schmitt trigger 301 one output of which is coupled as an input to an inverter circuit 302. Another output from the Schmitt trigger 301 is coupled to a single shot multivibrator 303. The output of the inverter is coupled as one input to an AND gate 304.

The output of the single shot multivibrator 303 is coupled to an inverter 305 and also coupled to a differentiator circuit 306. The output of the inverter 305 is coupled to a delay single shot multivibrator 306 the output of which is coupled to a sampling single shot multivibrator 307. The output of the single shot 307 is coupled as another input to AND gate 304 the output of which is coupled to a reset single shot 308.

The output of differentiator 306 is coupled as one input to an AND gate 309 and another output from differentiator 306 is coupled as an input to an AND gate 310.

The output of single shot multivibrator 308 is coupled to the reset input on a flip-flop 311. The output of flip-flop 311 is coupled as the other input to AND gate 309 the output of which goes to step motor logic and drive circuits 312. The output of circuit 312 goes to a stepping motor 313 which is used to drive a gear 314 which in turn drives a gear 315. There is a 4 to 1 ratio between gears 314 and 315. Gear 315 is mounted on a shaft 316 having a code wheel 317 on the outer end thereof and also drives a synchro transmitter 318. The output of the synchro transmitter goes to tape terminals 319 on output select switch 320. The other side of output select switch 320 is connected to a set of live terminals 321 and a set of center switch contacts 322 are connected to output terminals 323 which go to the user equipment.

Positioned on one side of code wheel 317 is a lamp 324 and on the other side of code wheel 317 is a photocell 325 which, when activated by light from lamp 324 produces a signal which is coupled to a Schmitt trigger 326 the output of which forms another input to AND gate 310. The output of AND gate 310 is coupled to a single shot multivibrator 327 the output of which is coupled to the set input on flip-flop 311. The output of flip-flop 311 is coupled as the other input to AND gate 309.

FIG. 4 illustrates the manner in which the tracks are positioned and laid down on the tape with respect to a tape head 401 having heads 1, 2, 3, and 4 thereon. The tape heads 1 through 4 lay down the tape tracks as shown on the magnetic tape 402.

*Operation*

With reference to FIG. 1, in combining the video and trigger inputs the positive going trigger voltage is applied to the single shot multivibrator 116 which reshapes the incoming trigger into a negative going pulse with a width of 4 micro-seconds. This negative going pulse is applied to the synch input of the video input distribution amplifier 114 where it is to be mixed with the video.

The positive going radar video is applied from input terminal 110 to a clamper 111 where it is clamped to zero level during the 4 micro-second pulse interval. This is done so that when the trigger is added in a later stage there is a good solid base line to reference the trigger against. The radar video is fed from the clamping circuit 111 to the video input of the video input distribution amplifier 114. The radar and trigger are added together in this chassis to merge as a composite signal of one volt peak to peak amplitude having a 0.7 volt positive going video component and a 0.3 volt negative going trigger component. This composite signal is then fed into a modulator unit, not shown, where it is converted from AM to FM prior to applying it to the recording heads for recording on magnetic tape.

The head switching transients on reproduction are eliminated through the use of the following techniques. The reproduced video and trigger from the tape are coupled in from terminal 118 to the output distribution amplifier 119 and fed into a head switching transient squelch circuit 120. This is a clamping circuit which clamps the video signal to zero level during the head switching interval. The head switching is initiated by a signal emitted from the switcher circuit 127 and this signal is brought out from the recorder through capacitor 128 and fed into a single shot multivibrator 129 where it is delayed a predetermined period of time. The width of this single shot pulse is adjusted to be equal to the amount of the delay between the initiating signal and the actual head switching. The trailing edge of the pulse from the single shot multivibrator 129 triggers the single shot multivibrator 130. The output width of the pulse from the single shot multivibrator 130 is adjusted to be equivalent to the duration of the head switching transient appearing on the video signal. This pulse then brackets, in the time domain, the head switching transient appearing on the video input to the head switching transient squelch circuit 120. The pulse from the single shot 130 is fed into the squelch circuit 120 and serves as a clamping signal which clamps the video to zero level during head switching time. Therefore, the output of the squelch circuit 120 represents the composite video signal with the transient removed and replaced by a corresponding "dead time." This "dead time" is approximately 0.9 micro-second duration and occurs approximately every 1040 micro-seconds. Putting this in terms of radar information it means that there is a dead time of 0.073 mile duration occurring every 84 miles, on a non-synchronous basis. In the light of existing radar pulse widths and pulse repetition frequencies, and considering that present day video processors do not quantize range into "buckets" smaller than ⅛ mile, the loss of information can be considered nil.

The technique utilized for separating the composite video signal emerging from the recorder chassis into its two components; namely trigger and video is as follows. The output of the squelch circuit 120 represents the composite video with the transient removed. The signal is then coupled into a video amplifier 121 where it is amplified and impedance matched into the video line driver 122. The radar video emerges from the line driver 122 on 75 ohm coax line and is fed out, to switch 113 and thence to the user equipment. This same output from the video line driver 122 is also fed back into the trigger separator 124 which is an AND gate where the negative going trigger component is sliced off and amplified. A negated head switching squelch pulse is also fed into the trigger separator 124 from the single shot multivibrator 130 and anded with the incoming composite video for the sake of adding extra reliability to the separation process. The separator trigger is fed into the trigger line driver 125 where it is impedance matched to the 75 ohm coax line feeding out through switch 113 and switch contacts 126, 133 to the load resistor 134 and thence to the user equipment.

With reference to FIG. 2, the incoming antenna azimuth signals are in the form of three phase synchro signals and since in the present equipment there is only one unused audio channel available a conversion or mixing of some kind must be performed to store this information. The technique utilized is a process whereby the incoming synchro signals are first converted to shaft position, the shaft position encoded into Δθ pulses plus cardinal bearing pulses, and these pulses placed on the audio channel in the record mode. In the playback mode these pulses are fed into circuits which advance a stepping motor a fixed angular increment for each Δθ pulse and also provide for orienting the output shaft in accordance with the cardinal bearing pulses. A synchro transmitter attached to the output shaft then converts this shaft position into three phase synchro information for transmittal to the user equipment.

The incoming antenna synchro signal is coupled into a conventional servo system which positions the two shafts 206 and 209, each having a code wheel attached. Code wheel 205 is geared to turn four times as fast as code wheel 210 and the 1 to 1 shaft. Code wheel 205 has 200 slots cut in its periphery with one of these slots being elongated as shown. As the shafts turn photocell 212 looks at the outer edge of code wheel 205 and counts the slots as they go by. The output of the photo-cell 212 is reshaped in the Schmitt trigger 216 and is fed to the single shot multivibrator 217. The single shot multivibrator 217 develops a 400 micro-second pulse for each slot passing the photo-cell. The single shot pulse is fed to the OR gate 218 which passes the pulse to the tape driver where it is recorded.

Photo-cell 214 looks through both code wheels 205 and 210 in such a way that the elongated slot in code wheel 205 is "anded" with the slot in code wheel 210. This means that every fourth time the elongated slot passes the photo-cell 214 a signal is generated. The signal is reshaped in the Schmitt circuit 222 and fed to the input of the single shot multivibrator 223. This single shot produces an output pulse which sets the flip-flop 224 to "one." The output of the flip-flop 224 is fed to the two legged AND gate 221. The second leg of the gate 221 is fed by a pulse from the single shot multivibrator 220. The output of the single shot multivibrator 220 constitutes a sampling pulse and the single shot 220 is fired 500 microseconds after the trailing edge of each increment pulse by virtue of the delay single shot multivibrator 230. In essence this means that after each and every increment pulse a sampling is performed on the flip-flop 224. If the flip-flop has been set to "one" during the period since the last increment pulse then a pulse appears at the output of the AND gate 221. This pulse is then fed to the input of the single shot multivibrator 225 which develops a 400 microsecond pulse at its output. This 400 micro-second pulse is fed to the second leg of the OR gate 218, the first leg having been connected to the single shot multivibrator 217. The output pulse from the single shot multivibrator 225 is also used to reset the flip-flop 224 to zero condition. The output of the OR gate 218 now contains both increment pulses and reference pulses in their proper relationship. The separation between the increment pulse and a reference pulse is always a fixed 500 micro-seconds. The separation of any two increment pulses will vary as a function of antenna speed. At the upper limit of antenna speed, 15 r.p.m., the separation between two adjacent increment pulses is 5,000 micro-seconds.

The pulses are fed from the output of the OR gate 218 of the tape driver 219 which passes them to the audio input of the recorder, not shown, at the proper voltage and impedance levels. The typical wave form appearing at the output of the tape driver is shown in FIG. 2.

Figure 3:
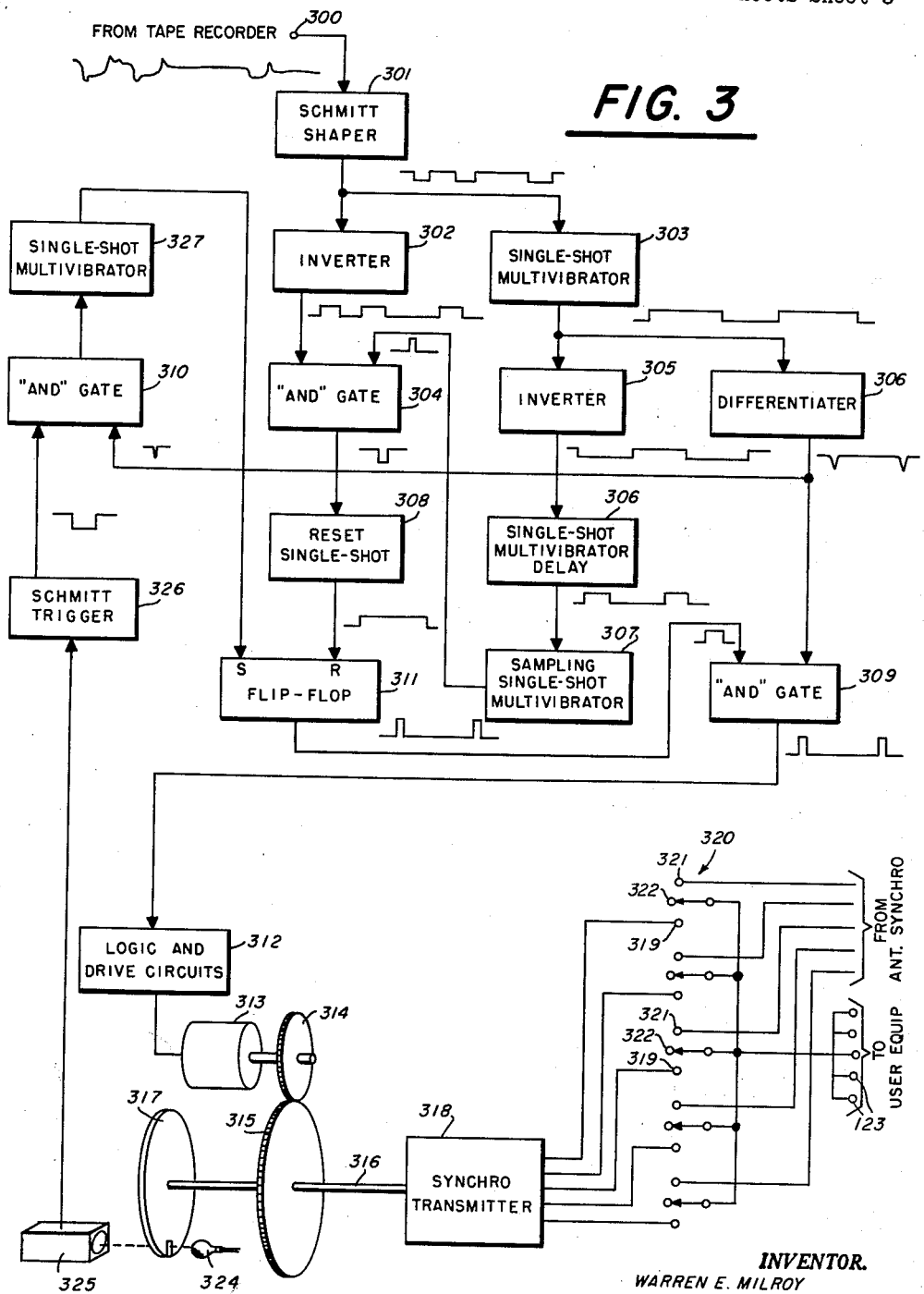
FIG. 3 is a simplified block diagram of the digital to synchro conversion unit used in reproducing the antenna azimuth position information from magnetic tape.

The conversion of synchro digital to synchro information during the playback mode will be explained with reference to FIG. 3 where the audio input-output from the recorder is coupled to terminal 300 and thence to the Schmitt trigger 301 where it emerges as a clean signal with essentially the same characteristics as the signal recorded originally. The signal is fed to a single shot 303 which has a period of 2000 micro-seconds, hence it can never respond to a "reference pulse" but will always respond to an "increment pulse," due to the timing relationship between the two types of pulses. The circuit 303 in effect masks out the reference pulses and sends out a pulse for each corresponding increment pulse. These pulses are then coupled to the differentiator 306 which puts out a narrower pulse corresponding in time to the leading edge of the incoming pulse. The output pulse from the differentiator 306 is fed to a two-legged AND gate 309. The second leg of the gate 309 is fed by the output of the flip-flop 311. The pulses pass through the AND gate 309 as long as the flip-flop 311 remains in the zero state. The output pulses from the AND gate 309 are fed into the logic and drive circuits contained within block 312. For each increment pulse at the input of the circuit 312 the step motor 313 is advanced one step, equivalent to 1.8 degrees of rotation.

The motor shaft in turn, through a 4 to 1 gear ratio, advances the output shaft 316, 0.45 degree. The output shaft moves through 360 degrees of rotation for each group of 800 increment pulses thus corresponding exactly to the 800 pulses encoded per each revolution of the input shaft during the record mode. Each time the output shaft 316 passes through the 000 degrees position the photo-cell 325 is energized and the output signal is processed through the Schmitt trigger 326, AND gate 310 and the single shot multivibrator 327 in such a way as to set the flip-flop 311 to "one." This causes the increment pulses to be denied to the stepping motor. The flip-flop 311 is reset to zero by the detection of a "reference pulse" on the incoming signal.

This detection is performed by generating a reference sampling pulse 1100 micro-seconds after the leading edge of each increment pulse. This pulse is coupled from the inverter 305 through a delay single shot 306, a single shot multivibrator 307 and ended with the incoming signal from the inverter 302 in AND gate 304. When a reference pulse is present it is detected by the AND gate 304 which in turn triggers the single shot multivibrator 308. The output of the single shot multivibrator 308 resets the flip-flop 311 to 0 and allows the increment pulses to once again pass to the step motor 313.

In essence then the operation during playback is as follows: each time the output shaft passes through the 000 degrees position an automatic check is performed by the flip-flop 311 to determine whether the output shaft is properly oriented with the incoming information from the tape. If it is not oriented properly it will stop and wait for the incoming information to catch up. After having completed the initial correction cycle the output shaft is always in exact agreement with the incoming information. A synchro transmitter 318 attached to the output shaft 316 generates the required three phase synchro signals which are fed out of the system to the user equipments.

Through the use of these systems a high order of timing accuracy is provided which means that the reproduced radar information is essentially that which would be seen on a live presentation. In addition the relationship of the antenna azimuth with respect to that displayed live is highly accurate due to the automatic check performed in the digital to synchro conversion unit.

It will be understood that various changes in the details materials, steps and arrangements of parts, which have herein been described and illustrated in order to explain the nature of the invention, may be made by those skilled in the art within the principle and scope of the invention as expressed in the appended claims.

What is claimed is:

1. A system for recording radar information on magnetic tape comprising; input means adapted for receiving video output from a radar unit; clamping means coupled to said input means for clamping said video to a predetermined voltage level; other input means adapted to receive radar trigger information from a radar unit; trigger means operatively connected to said other input means for shaping said incoming trigger signal to a predetermined pattern; said trigger means having an output; conducting means between the output of said trigger means and an input to said clamping means for coupling the output of said trigger circuit means to the input of said clamper means, video amplifying means, the output of said trigger means also coupled to an input on said video amplifying means; the output of said clamper unit also being coupled to said video amplifying means; said video amplifying means having an output which is ultimately recorded on magnetic tape; additional input means adapted to receive signals recorded on a magnetic tape; head switching transient squelch means connected to said additional input means for squelching the head switching transient produced when the recording heads on a magnetic tape unit are switched; head switching squelch pulse producing means adapted for receiving an input from a magnetic tape unit and having an output coupled to said head switching transient squelch means; other video amplifier means operatively coupled to the output of said head switching transient squelch means for amplifying video; output means operatively coupled to said other video amplifier means for providing an output source of video; trigger separator means operatively coupled to the output of said other video amplifier means and coupled to the output of said head switching squelch pulse producing means for separating the radar trigger recorded on the tape; and radar trigger output means operatively coupled to the trigger separator for providing an output radar trigger.

2. A synchro to digital conversion unit for use with a radar information recording system comprising; servo means adapted to be coupled to a radar antenna for following the azimuth positions of a radar antenna; drive means operatively coupled to said servo means; coding means operatively coupled to said drive means for producing an output code when driven by said drive means dependent upon the speed of said antenna; other coding means operatively coupled to said drive means for producing another output code; said code means producing increment pulses corresponding to the instantaneous azimuthal position of said radar antenna, the other code means producing reference pulses corresponding to a reference position for synchronizing purposes; tape driver means having an input and an output, said input to said tape driver means being operatively coupled to said code means and said other code means, the output of said tape driver means comprising incremental pulses corresponding to azimuthal position and reference pulses.

3. A synchro to digital conversion unit as set forth in claim 2 and further including; sampling means operatively coupled to the output of said code means for performing a sampling on said increment pulses corresponding to azimuthal positions; flip-flop means operatively connected to the output of said other code means and having outputs corresponding to ones and zeros; an AND gate operatively coupled to the output of said sampling means and the output of said flip-flop means for producing an output pulse when an output is present at said sampling means and when said flip-flop is set to a position corresponding to a one; buffer means operatively connected to the output of said AND gate and said code means and having an output connected to the input on said tape driver means.

4. A synchro to digital conversion system as set forth in claim 2 wherein; said coding means comprises a code wheel having slots in the periphery; and said code means for providing increment pulses comprises a lamp and photo-cell wherein said photo-cell produces output pulses when the light from said lamp shines through a slot on the periphery of said code wheel.

5. A synchro to digital conversion system as set forth in claim 4 wherein said other coding means comprises; another code wheel having a single slot in the periphery thereof in position adjacent to and in close proximity to said increment pulse code wheel; another photo-cell and lamp positioned such that the lamp is adjacent to said other code wheel and said photo-cell is positioned adjacent said increment pulse code wheel and a reference pulse is produced when light rays from said lamps shine through the single slot in the other code wheel and line up and through a slot in said increment pulse code wheel.

6. A digital to synchro conversion unit comprising; input means adapted to receive signals consisting of reference and increment pulses; circuit means operatively connected to the input for deleting reference pulses and passing increment pulses; coincidizing means operatively coupled to the output of said circuit means and having inputs and an output, one input being operatively connected to the output of said circuit means; flip-flop means having inputs and an output and having reference positions corresponding to one and zero, the output from said flip-flop means being operatively connected to an input of said coincidizing means; said coincidizing means producing an output pulse when pulses from said circuits means corresponding to increment pulses and output pulses from said flip-flop means when said flip-flop is in a zero state are present at the inputs to said coincidizing means; drive means operatively connected to the output of said coincidizing means and having an output; stepping motor means operatively connected to the output of said drive means; synchro transmitter means operatively connected to the output of said stepping motor means for producing an output corresponding to an azimuthal position; coding means operatively connected to said synchro transmitter means for producing an output pulse when the synchro transmitter means is in a position corresponding to 00 azimuth; the output of said coding means being operatively coupled to the flip-flop means for setting said flip-flop means in a one position; such structure being so arranged that when said flip-flop is in a one position the increment pulses from the output of said coincidizing means are not present; and reset means operatively connected to said input for resetting said flip-flop to zero position when reference pulses are present at the input.

7. A digital to synchro converter as set forth in claim 6 and further including reference sampling pulse means operatively connected to the output of said circuit means for producing a pulse corresponding to a reference pulse; other coincidizing means having inputs and an output, one input of said coincidizing means being connected to the output of said sampling pulse means, the other input on said other coincidizing means being operatively connected to the input to which increment and reference pulses are coupled, said other coincidizing means being operative to produce an output pulse when reference sampling pulse and reference pulses from said input means are coincident therein; the output of said coincidizing means being coupled to the input of said reset means for setting said flip-flop to a zero condition.

8. A system for recording radar information on magnetic tape comprising; input means adapted for receiving radar video; clamping means coupled to said input means for clamping said radar video to a predetermined voltage level; other input means adapted to receive radar trigger information; trigger means operatively connected to said other input means for shaping said incoming trigger signal to a predetermined pattern, said trigger circuit having an output; conducting means between the output of said trigger circuit means and an input to said clamping means for coupling the output of said trigger circuit means to the input of said clamping means, a video amplifier; the output of said trigger circuit means also coupled to an input on said video amplifier; the output of said clamping means also being coupled to said video amplifier; said video amplifier having an output which is ultimately recorded on magnetic tape; said system further comprising terminal means adapted to receive signals recorded on a magnetic tape; head switching transient squelch means connected to said terminal means for squelching the head switching transient produced when the recording heads on a magnetic tape unit are switched; head switching squelch pulse producing means adapted for receiving an input from a magnetic tape unit and having an output coupled to said head switching transient squelch means; video amplifier means operatively coupled to the output of said head switching transient squelch means for amplifying output radar video; output means operatively coupled to said video amplifier means for providing an output source of radar video; trigger separator means operatively coupled to the output of said video amplifier means and coupled to the output of said head switching squelch pulse means for separating the radar trigger recorded on a tape; radar trigger output means operatively coupled to the trigger separator for providing an output radar trigger; means for recording azimuth positions on tape comprising servo means adapted to be coupled to a radar antenna for following the azimuth positions of a radar antenna; drive means operatively coupled to said servo means; coding means operatively coupled to said drive means for producing an output code when driven by said drive means dependent upon the speed of an antenna; other coding means operatively coupled to said drive means for producing another output code; said code means producing increment pulses corresponding to the instantaneous azimuthal position of an antenna, the other code means producing reference pulses corresponding to a reference position for synchronizing purposes; the tape driver means having an input and an output, said input to said tape driver means being operatively coupled to said code means and said other code means, the output of said tape driver means being adapted to be operatively coupled to an audio input on a tape recorder for recording the increment pulses corresponding to azimuthal position and said reference pulses on a magnetic tape; means for converting azimuth positions recorded on tape into user information comprising; input means adapted to receive signals consisting of reference and increment pulses; circuit means operatively connected to the input for deleting reference pulses and passing increment pulses; coincidizing means operatively coupled to the output of said circuit means and having inputs and an output, one input being operatively connected to the output of said circuit means; flip-flop means having inputs and an output and having reference positions corresponding to one and zero, the output from said flip-flop means being operatively connected to an input of said coincidizing means; said coincidizing means producing an output pulse when pulses from said circuit means corresponding to increment pulses and pulses from said flip-flop means when said flip-flop is in a zero state are present at the inputs to said coincidizing means; drive means operatively connected to the output of said coincidizing means and having an output; stepping motor means operatively connected to the output of said drive means; synchro transmitter means operatively connected to the output of said stepping motor means for producing an output corresponding to an azimuthal position; coding means operatively connected to said synchro transmitter means for producing an output pulse when the synchro transmitter means is in a position corresponding to 00 azimuth; the output of said coding means being operatively coupled to the flip-flop means for setting said flip-flop means in a one position; the structure being so arranged that when said flip-flop is in a one position the increment pulses from the output of said coincidizing means are not present; and reset means operatively connected to said input for resetting said flip-flop to zero position when reference pulses are present at the input, said system being functionally interrelated such that radar video and trigger information are recorded with reference to a correct azimuthal position.

No references cited.

CHESTER L. JUSTUS, *Primary Examiner.*